United States Patent
Kowalsky et al.

(10) Patent No.: US 6,905,008 B2
(45) Date of Patent: Jun. 14, 2005

(54) ELECTROMAGNETIC CLUTCH ASSEMBLY HAVING SOLENOID TYPE OPERATOR

(75) Inventors: Christopher J. Kowalsky, Windsor (CA); Larry A. Pritchard, Macomb, MI (US); Brian Kappler, Lake Orion, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 10/638,781

(22) Filed: Aug. 11, 2003

(65) Prior Publication Data

US 2005/0034950 A1 Feb. 17, 2005

(51) Int. Cl.[7] .............................................. F16D 27/115
(52) U.S. Cl. ........................ 192/35; 192/48.2; 192/93 A
(58) Field of Search ....................... 192/35, 48.2, 54.52, 192/84.7, 84.96, 93 A

(56) References Cited

U.S. PATENT DOCUMENTS

| | | | |
|---|---|---|---|
| 4,838,118 A | * 6/1989 | Binkley | ........................ 475/86 |
| 4,989,686 A | 2/1991 | Miller et al. | |
| 5,083,986 A | 1/1992 | Teraoka et al. | |
| 5,464,084 A | * 11/1995 | Aoki et al. | ..................... 192/35 |
| 5,810,141 A | * 9/1998 | Organek et al. | .............. 192/35 |
| 5,911,643 A | * 6/1999 | Godlew et al. | .............. 475/150 |
| 5,954,173 A | * 9/1999 | Sakai et al. | ..................... 192/35 |
| 6,098,770 A | 8/2000 | Isley, Jr. | |
| 6,101,897 A | 8/2000 | Showalter | |
| 6,196,361 B1 | 3/2001 | Russ et al. | |
| 6,327,935 B1 | 12/2001 | Joslin et al. | |
| 6,378,677 B1 | 4/2002 | Kuroda et al. | |
| 6,537,172 B1 | * 3/2003 | McAuliffe et al. | ........... 475/150 |
| 6,691,845 B2 | * 2/2004 | Showalter | ..................... 192/35 |

* cited by examiner

*Primary Examiner*—Saul Rodriguez
(74) *Attorney, Agent, or Firm*—Brinks Hofer Gilson & Lione; Greg Dziegielewski

(57) ABSTRACT

An electromagnetic clutch assembly having a solenoid activated ball ramp operator provides reduced power consumption and improved control. The electromagnetic clutch assembly includes a primary or pilot friction clutch pack and a secondary or main friction clutch pack. An annular solenoid coil cooperates with an annular operator or plunger. When the coil is energized, the annular plunger translates and compresses the primary or pilot friction clutch pack. Activation of the pilot clutch pack retards motion of one of the members of the ball ramp operator which, in turn, compresses a secondary or main friction clutch pack disposed across the input and output members.

20 Claims, 3 Drawing Sheets

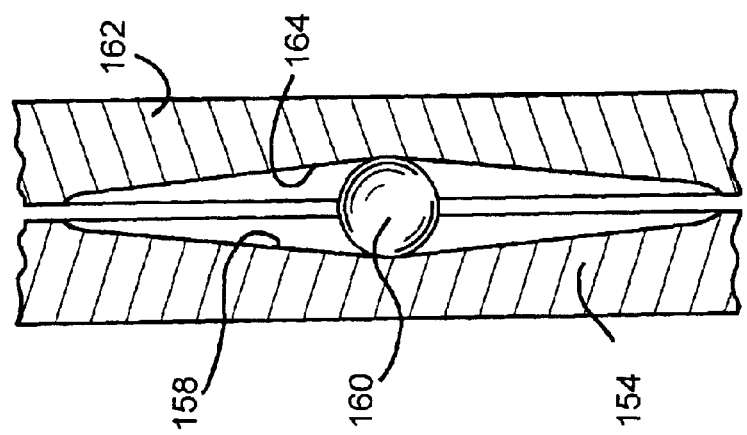
FIG.3
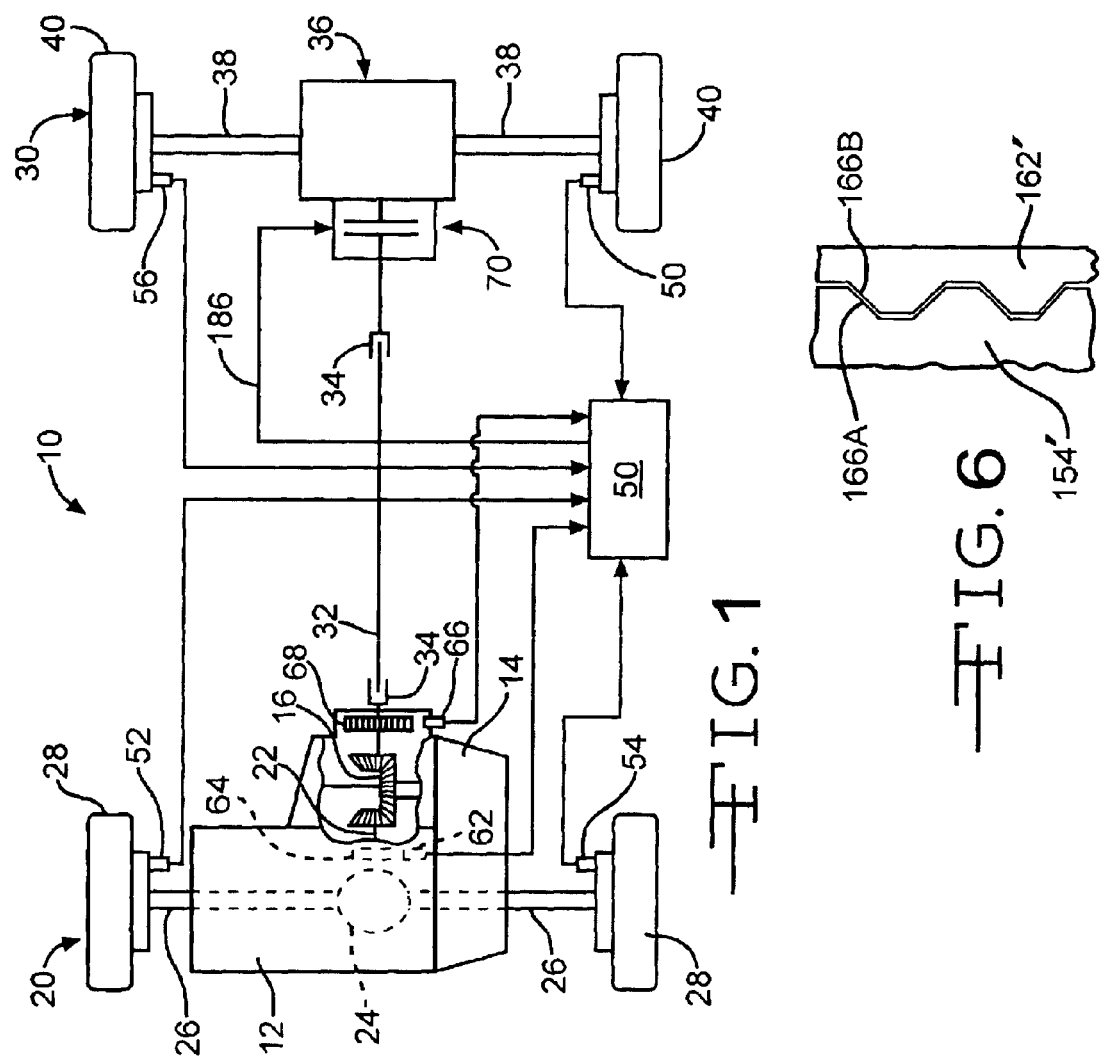
FIG.1
FIG.6

ELECTROMAGNETIC CLUTCH ASSEMBLY HAVING SOLENOID TYPE OPERATOR

BACKGROUND OF THE INVENTION

The invention relates generally to electromagnetic clutches and more specifically to an electromagnetic clutch having a solenoid activated ball ramp operator.

Clutches which are activated or energized by electromagnetic coils are extraordinarily common components in rotary power transmission systems, both in stationary applications and in motor vehicles. Such electromagnetic clutches may be broadly characterized by whether they provide on-off energy transfer or modulating energy transfer. In the case of the former, dog clutches which may include auxiliary synchronizing devices are utilized whereas in the latter, friction clutch packs having a plurality of interleaved friction plates or discs are utilized. In either case, an electromagnetic operator which translates or compresses components of the clutch upon energization activates the clutch and upon deenergization deactivates or relaxes the clutch.

One of the design and operational characteristics of electromagnetic clutches which receives significant engineering attention is power consumption. It is desirable, especially in motor vehicles, to design and utilize a clutch having low power consumption. Low power consumption is desirable in and of itself but it also reduces the heat generated by the coil and lower power consumption can reduce the need for cooling the coil, can improve the service life of the coil and is therefore overall a desirable design goal.

A design which exhibits low power consumption is generally referred to as a cam or ball ramp actuated clutch. Here, a pair of opposed plates having caming members or opposed arcuate recesses which receive balls or roller bearings separate upon relative rotation caused by drag resulting from energization of the electromagnetic coil. Such separation compresses an adjacent friction clutch pack which transfers drive energy or torque across the friction clutch pack. Such a device is disclosed in conjunction with a transfer case in U.S. Pat. No. 4,989,686, co-owned by the Assignee herein.

SUMMARY OF THE INVENTION

An electromagnetic clutch assembly having a solenoid activated ball ramp operator provides reduced power consumption and improved control. The electromagnetic clutch assembly includes a primary or pilot friction clutch pack and a secondary or main friction clutch pack. An annular coil and housing cooperates with an annular operator or plunger. When the coil is energized, the annular plunger translates and compresses the primary or pilot friction clutch pack. Activation of the pilot clutch pack retards motion of one of the members of the ball ramp actuator which, in turn, compresses a secondary or main friction clutch pack disposed across the input and output members, thereby transferring torque. The friction clutch packs are preferably wet, i.e., are contained within a sealed housing containing clutch fluid. The clutch assembly of the present invention exhibits reduced power consumption and improved linearity of operation.

It is thus an object of the present invention to provide an electromagnetic clutch having a solenoid type operator.

It is a further object of the present invention to provide an electromagnetic clutch having a solenoid operator, a ball ramp actuator and primary and secondary friction clutch packs.

It is a further object of the present invention to provide an electromagnetic clutch having a solenoid operator and primary and secondary wet friction clutch packs.

It is a still further object of the present invention to provide an electromagnetic clutch having a solenoid type operator and ball ramp actuator which exhibits reduced power consumption and improved linearity of operation.

It is a still further object of the present invention to provide an electromagnetic clutch for use in transfer cases, rear axles and other motor vehicle drive line components.

Further objects and advantages of the present invention will become apparent by reference to the following description of the preferred embodiment and appended drawings wherein like reference numbers refer to the same component, element or feature.

BRIEF DESCRIPTION OF THE DRAWINGS

FIG. 1 is a diagrammatic view of a four-wheel drive motor vehicle power train including an electromagnetic clutch assembly having a solenoid type operator according to the present invention disposed adjacent a rear differential;

FIG. 3 is a flat pattern development of a ball ramp actuator of the electromagnetic clutch assembly according to the present invention taken along line 3—3 of FIG. 2;

FIG. 6 is a side elevational view of an alternate embodiment of a cam actuator having oblique camming surfaces for an electromagnetic clutch assembly having a solenoid type operator according to the present invention.

DETAILED DESCRIPTION OF THE PREFERRED EMBODIMENT

Figure 2:
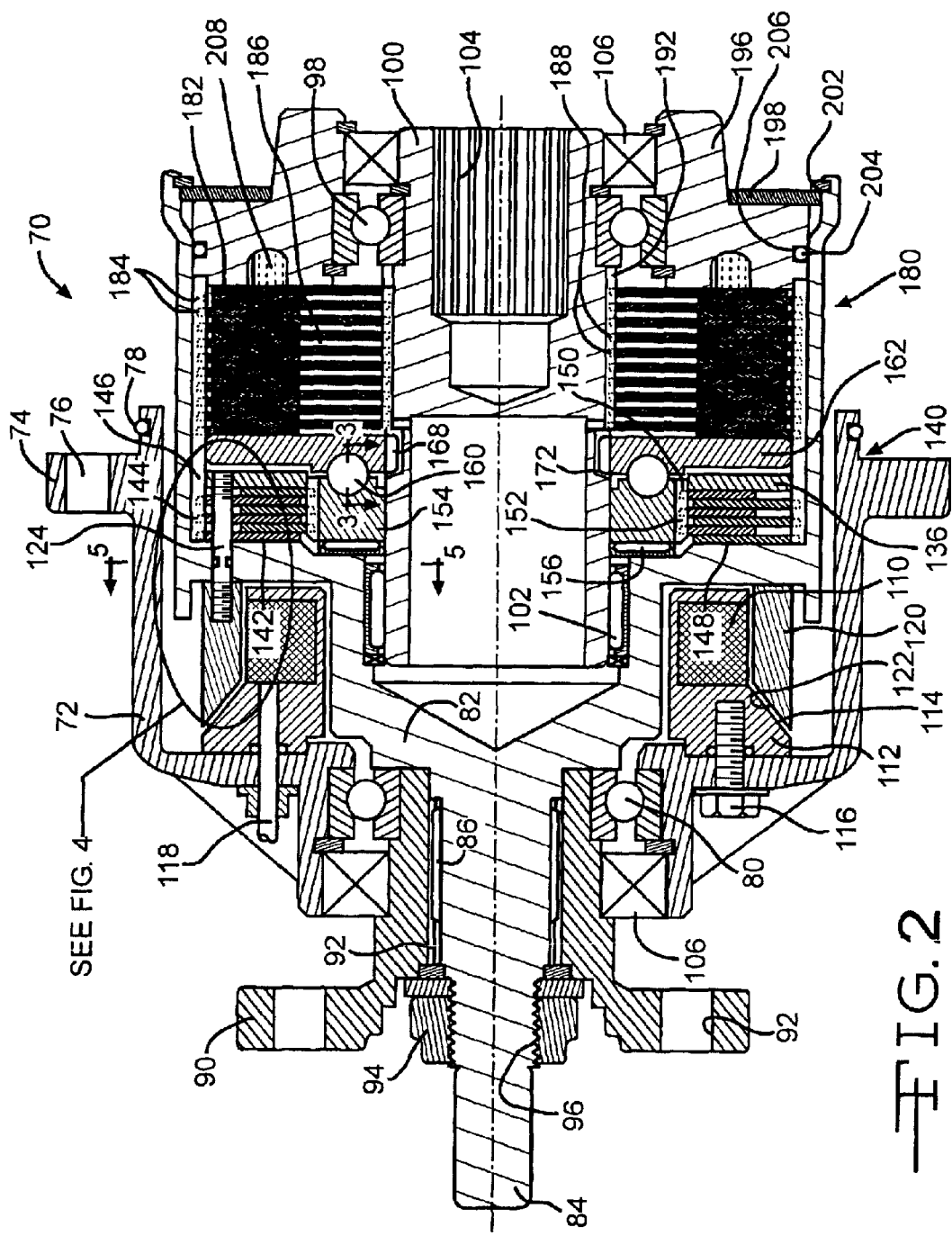
FIG. 2 is a full, sectional view of an electromagnetic clutch assembly having a solenoid type operator according to the present invention.

Referring now to FIG. 1, a four-wheel vehicle drive train incorporating the present invention is diagrammatically illustrated and designated by the reference number 10. The four-wheel vehicle drive train 10 includes a prime mover 12 which is coupled to and directly drives a transaxle 14. The output of the transaxle 14 drives a beveled or spiral beveled gear set 16 which provides motive power to a primary or front drive line 20 comprising a front or primary propshaft 22, a front or primary differential 24, a pair of live front axles 26 and a respective pair of front or primary tire and wheel assemblies 28. It should be appreciated that the front or primary differential 24 is conventional.

The beveled or spiral beveled gear set 16 also provides motive power to a secondary or rear drive line 30 comprising a secondary propshaft 32 having appropriate universal joints 34, a rear or secondary differential assembly 36, a pair of live secondary or rear axles 38 and a respective pair of secondary or rear tire and wheel assemblies 40.

The foregoing description relates to a vehicle wherein the primary drive line 20 is disposed at the front of the vehicle and, correspondingly, the secondary drive line 30 is disposed at the rear of the vehicle, such a vehicle commonly being referred to as a front wheel drive vehicle. The designations "primary" and "secondary" utilized herein refer to drive lines providing drive torque at all times and drive lines providing supplemental or intermittent torque, respectively. These designations (primary and secondary) are utilized herein rather than front and rear inasmuch as the invention herein disclosed and claimed may be readily utilized with vehicles wherein the primary drive line 20 is disposed at the rear of the vehicle and the secondary drive line 30 and components within the secondary differential assembly 36 are disposed at the front of the vehicle.

Thus, the illustration of FIG. 1, wherein the primary drive line 20 is disposed at the front of the vehicle should be understood to be illustrative rather than limiting and that the components and the general arrangement of components illustrated is equally suitable and usable with a primary rear wheel drive vehicle. In such a vehicle, the primary differential 24 would replace the secondary differential assembly 36 at the rear of the vehicle and the secondary differential assembly 36 would be moved to the front of the vehicle to replace the primary differential 24.

Associated with the vehicle drive train 10 is a controller or microprocessor 50 which receives signals from a plurality of sensors and provides a control, i.e., actuation, signal to an electromagnetic clutch assembly 70 operably disposed before the secondary differential assembly 36. Specifically, a first sensor such as a variable reluctance or Hall effect sensor 52 senses the rotational speed of the right primary (front) tire and wheel assembly 28 and provides an appropriate signal to the microprocessor 50. Similarly, a second variable reluctance or Hall effect sensor 54 senses the rotational speed of the left primary (front) tire and wheel assembly 28 and provides a signal to the microprocessor 50. A third variable reluctance or Hall effect sensor 56 senses the rotational speed of the right secondary (rear) tire and wheel assembly 40 and provides a signal to the microprocessor 50. Finally, a fourth variable reluctance or Hall effect sensor 58 associated with the left secondary (rear) tire and wheel assembly 40 senses its speed and provides a signal to the microprocessor 50. It should be understood that the speed sensors 52, 54, 56 and 58 may be independent, i.e., dedicated, sensors or may be those sensors mounted on the vehicle for anti-lock brake systems (ABS) or other speed sensing and control equipment. It is also to be understood that an appropriate and conventional counting or tone wheel is associated with each of the speed sensors 52, 54, 56 and 58 although they are not illustrated in FIG. 1.

The controller or microprocessor 50 may also receive information regarding the output speed of the transaxle 14. A variable reluctance or Hall effect sensor 62 which is associated with a tone wheel 64 on the front or primary prop shaft 22 may be utilized. In the alternative, a variable reluctance or Hall effect sensor 66 associated with the secondary drive line 30 may be positioned adjacent a tone wheel 68 on the secondary output of the transaxle 14 driving the secondary differential assembly 36. The controller or microprocessor 50 includes software which receives and conditions the signals from the sensors 52, 54, 56 and 58 as well as either the sensor 62 or the sensor 66, determines corrective action to improve the stability of the vehicle, maintain control of the vehicle and/or correct or compensate for a skid or other anomalous operating condition of the vehicle and provides an output signal to the electromagnetic clutch assembly 70.

Referring now to FIGS. 1 and 2, the electromagnetic clutch assembly 70 includes a cylindrical, bell-shaped housing 72 having a continuous flange or a plurality of ears or lugs 74 defining a plurality of through openings 76 which are adapted to receive, for example, threaded fasteners (not illustrated) which facilitate installation and disassembly of the clutch assembly 70 from the housing of the secondary differential assembly 36 illustrated in FIG. 1. An O-ring seal 78 facilitates a fluid tight seal between the cylindrical housing 92 and the housing of the secondary differential assembly 36. The cylindrical housing 72 receives and supports an anti-friction bearing such as a ball bearing assembly 80 which freely rotatably supports a bell-shaped input member 82.

The input member 82 preferably includes an input stub shaft 84 having male splines 86. Other positive drive means such as keyways, hexagonal flats and the like may also be defined by the input stub shaft 84. The male splines 86 may be engaged by complementary female splines 88 formed within a flange 90. The flange 90 may be a portion of a universal joint 34 (illustrated in FIG. 1) or other component of the secondary prop shaft 32. The flange 90 will typically include through apertures 92 which facilitate such connection. The flange 90 is preferably retained on the input stub shaft 84 by a nut 94 received on male threads 96 on the input stub shaft 84. A second anti-friction bearing such as a ball bearing assembly 98 freely rotatably supports a cylindrical output hub 100. The end of the output hub 100 opposite the ball bearing assembly 98 is supported by an anti-friction bearing such as a roller bearing 102. The interior cylindrical wall of the output hub 100 defines a plurality of female splines or gear teeth 104. Adjacent and outboard of both of the ball bearing assemblies 80 and 98 are oil seals 106 which provide fluid tight seals between adjacent components of the clutch assembly 70.

Secured to the cylindrical, bell-shaped housing 72 is an electromagnetic or solenoid coil 110 which is positioned and protected within a flux concentrating annular housing 112. The annular housing 112 includes an oblique or frusto-conical surface 114. The annular housing 112 is secured to the cylindrical housing 72 by a plurality of threaded studs, fasteners 116 or similar devices, one of which is illustrated in FIG. 2. A single or multiple conductor cable 118 provides electrical energy to the solenoid coil 110. Surrounding portions of the solenoid coil 110 and the annular housing 112 is an annular solenoid operator member or plunger 120 having a complementary oblique or frusto-conical surface 122 which aligns with and is adjacent to the frusto-conical surface 114 on the annular coil housing 112.

Figure 4:
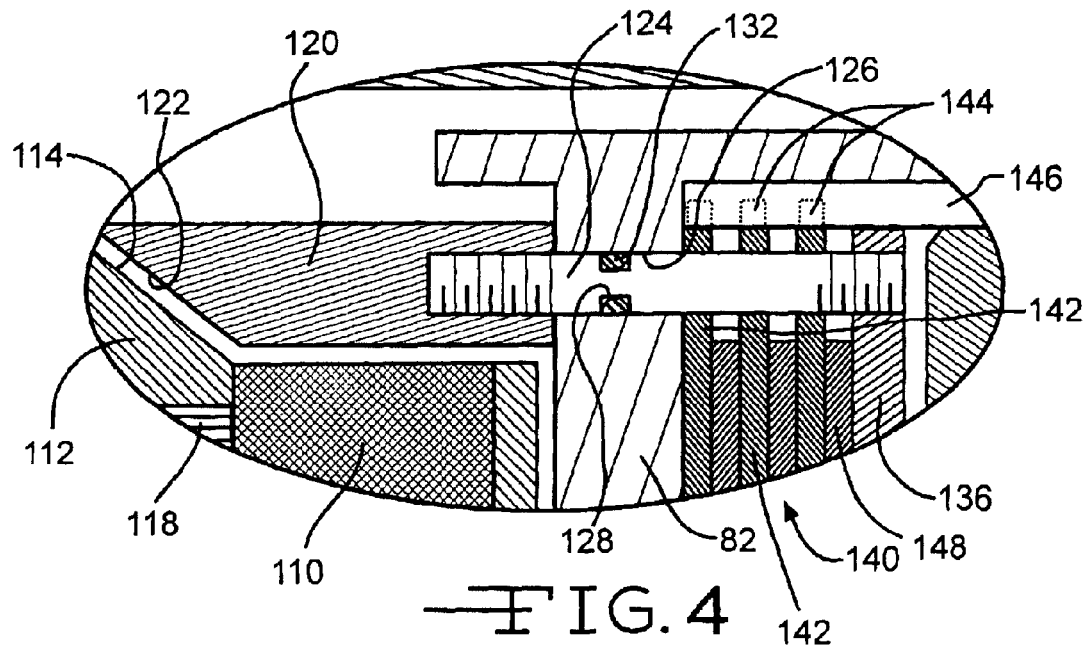
FIG. 4 a fragmentary, enlarged view of an electromagnetic clutch assembly having a solenoid type operator according to the present invention.
Figure 5:
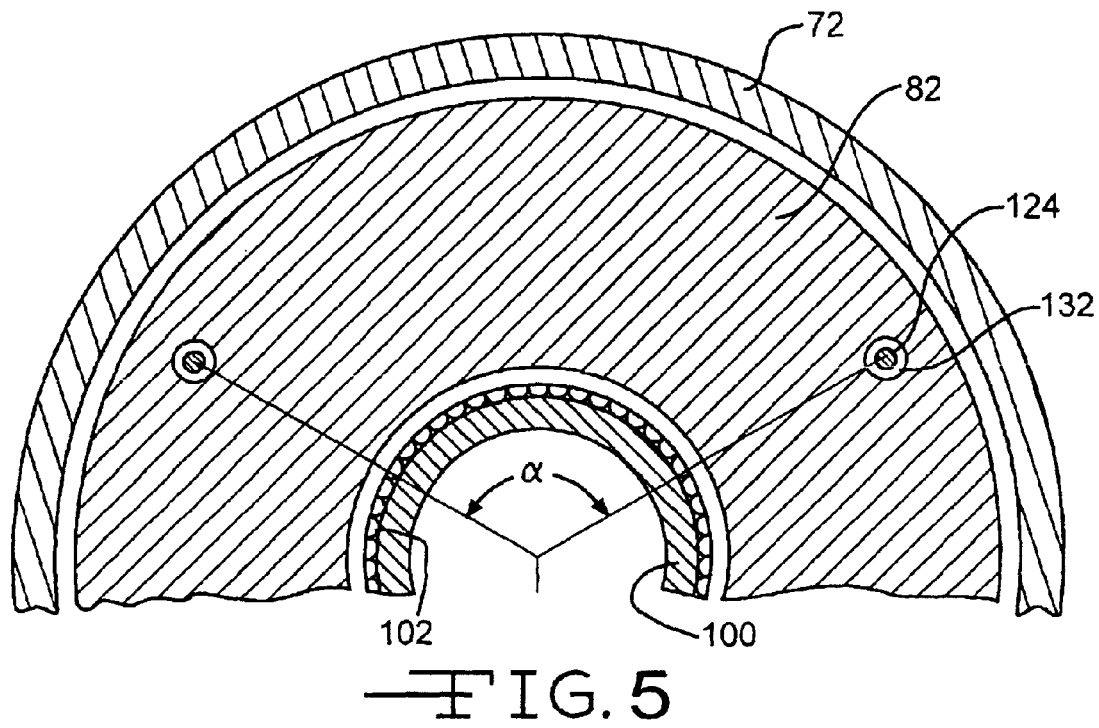
FIG. 5 is a fragmentary, sectional view of an electromagnetic clutch assembly having a solenoid type operator according to the present invention taken along line 5—5 of FIG. 3.

As illustrated in FIGS. 4 and 5, the solenoid plunger 120 receives a plurality, preferably three, stanchions or studs 124 which extend axially and in parallel away from the solenoid plunger 120 and through axial passageways 126 in a radially and circumferentially extending portion of the input member 82. If three stanchions or studs 124 are utilized, the angle $\alpha$ between them will be 120°. If four stanchions or studs 124 are utilized, the angle $\alpha$ will be 90°. Stated more generally, the stanchions or studs 124, however many are utilized, should be equally angularly spaced about the plunger 120. The stanchions or studs 124 are preferably threaded as illustrated and a suitable thread locking compound may be utilized. Alternatively, the stanchions or studs 124 may be an interference fit within blind bores in the solenoid plunger 120 or they may be secured thereto by radially oriented retaining pins (not illustrated) extending through the wall of the plunger 120 and the studs 124 or, for example, by welding.

The stanchions or studs 124 each include a circumferential groove 128 which receives an O-ring seal 132 which proves a fluid tight seal between the stanchion or stud 124 and the axial passageway 126 of the input member 82. The ends of the stanchions or studs 124 opposite the solenoid plunger 120 are also preferably threaded and received within and secured to an annular first pressure or apply plate 136. A pilot or primary friction clutch pack 140 is disposed between the radially and circumferentially extending portion of the input member 82 and the first apply plate 136. It will be appreciated that energization of the solenoid coil 110 urges the solenoid plunger 120 toward the left as illustrated in FIGS. 2 and 4. As it closes the air gap between the frusto-conical surfaces 114 and 122, the first apply plate 136 compresses the pilot or primary friction clutch pack 140.

Referring now to FIGS. 2 and 3, the pilot or primary friction clutch pack 140 includes a first plurality of larger diameter clutch discs or plates 142 with male or exterior splines 144 which engage complementary female splines 146 on the inner surface of the input member 82. The first plurality of larger diameter friction clutch plates 142 thus rotate with the input member 82. Interleaved with the first plurality of larger diameter clutch plates 142 is a second plurality of smaller diameter friction clutch discs or plates 148 which have internal female splines 150 which engage complementarily configured to male splines 152 on a circular clutch hub 154. Both the first and second pluralities of clutch plates 142 and 148 preferably include suitable friction clutch paper or material which functions optimally when disposed in and wetted by clutch fluid. The clutch hub 154 is freely rotatably disposed upon the output hub 100 and a anti-friction roller bearing assembly 156 disposed between the circular clutch hub 154 and an adjacent radially and circumferentially extending surface of the input hub 82 ensures such free rotation.

The circular clutch hub 154 includes a plurality, preferably three, ramped recesses 158 disposed in a circular pattern about the axis of the output hub 100. The recesses 158 each define an oblique section of a helical torus. Disposed within each of the recesses 158 is a load transferring member such a ball bearing 160 or similar component which rolls along the ramps defined by the recesses 158. A larger diameter circular member 162 is disposed in opposed relationship with the circular clutch hub 154 and includes a like plurality of complementarily sized and arranged recesses 164. The load transferring balls 160 are received and trapped within the pairs of opposed recesses 158 and 164, the ends of the recesses 158 and 164 being curved and much steeper in slope than the central regions of the recesses 158 and 164.

It will be appreciated that the recesses 158 and 164 and the load transferring balls 160 may be replaced with other analogous mechanical elements which cause axial displacement of the circular clutch hub 154 and second circular member 162 in response to relative rotation therebetween. For example, tapered rollers disposed in complementarily configured conical helices or complementary oblique face cams with or without intermediate mechanical elements such as rollers may be utilized.

As illustrated in FIG. 6, the camming operator may alternately include opposed face cams 166A and 166B disposed on a circular clutch hub 154' and a larger diameter circular member 162'. In a manner similar to the action of the recesses 158 and 164 and load transferring balls 160, upon relative rotation of the circular clutch hub 154' and the circular member 162', the face cams 166A and 166B axially separate the clutch hub 154' and the circular member 162'.

An important design consideration of the recesses 158 and 164 and the load transferring balls 160 and the face cams 166A and 166B is that the geometry, the overall design and the clearances of the clutch assembly 70 ensure that it is not self-engaging. The electromagnetic clutch assembly 70 must not self-engage but rather must be capable of modulating clamping of the friction clutch packs in direct, proportional response to the input signal provided by the controller or microprocessor 50.

Referring again to FIG. 2, the larger circular member 162 includes female or internal splines 168 which are engaged by male or external splines or gear teeth 172 on the output hub 100 such that the larger diameter circular member 162 rotates with the output hub 100.

Disposed adjacent the larger circular member 162 is a main or secondary friction clutch pack assembly 180. The main or secondary friction clutch pack assembly 180 includes a first plurality of larger diameter friction clutch discs or plate 182 having external or male splines 184 which are received within the female splines 146 on the input member 82. Interleaved with the first plurality of friction clutch plates 182 is a second plurality of smaller diameter friction clutch discs or plates 186 having internal or female splines 188 which are engaged by complementarily configured male splines 192 on the output hub 100. Both the friction plates 182 and 186 preferably include friction clutch paper or material which functions optimally when disposed in and wetted by clutch fluid. A circular collar 196 provides a reaction surface for the main or secondary friction clutch pack 180 and extends between the inner surface of the input member 82 and the ball bearing assembly 98 and the oil seal 106. The collar 196 is maintained in position by a cooperating retaining washer 198 and a snap ring 202. An O-ring 204 disposed within a circumferential channel 206 provides a suitable seal between the circular collar 196 and the input member 82.

It will thus be appreciated that the interior region of the clutch assembly defined generally by the input member 82 and the circular collar 196 is sealed by the O-rings 106, 132 and 204 thereby facilitating the retention of clutch fluid 208 therein and the use of wet friction clutch pack 140 and 180 and the use of compatible friction materials on the friction plates 142, 148, 182 and 186.

In operation, the application of electrical energy to the solenoid coil 110 draws the annular plunger 120 toward the annular housing 112, compressing the pilot friction clutch pack 140 and creating drag which tends to rotate the first circular hub 154 relative to the second circular member 162, causing the load transferring balls 160 to ride up the recesses 158 and 162 and driving the circular clutch hub 154 and the circular member 162 apart. The circular member 162 acts as an apply plate and such axial motion compresses the main or secondary friction clutch pack 180 and transfers torque between the input member 82 and the output hub 100. The magnetic attraction between the solenoid housing 112 and the plunger and especially the oblique air gap between the frusto-conical surfaces 114 and 122 has been found to provide improved control and linearity of operation.

The foregoing disclosure presents the invention in conjunction with the rear differential of a motor vehicle having a primary front wheel drive powertrain. Nonetheless, it should be appreciated that the electromagnetic clutch having a solenoid type operator according to the present invention has wide application in mechanical power distribution systems requiring accurate and repeatable modulating clutch operation. Hence, the electromagnetic clutch may be utilized in motor vehicle driveline components such as transfer cases and the like.

The foregoing disclosure is the best mode devised by the inventors for practicing this invention. It is apparent however, that devices incorporating modifications and variations will be obvious to one skilled in the art of electromagnetic clutch assemblies. Inasmuch as the foregoing disclosure presents the best mode contemplated by the inventors for carrying out the invention and is intended to enable any person skilled in the pertinent art to practice this invention, it should not be construed to be limited thereby but should be construed to include such aforementioned obvious variations and be limited only by the spirit and scope of the following claims.

We claim:

1. An electromagnetic solenoid type clutch assembly comprising, in combination,
   an input member and a coaxially disposed output member,
   a camming operator having a first member having a plurality of camming surfaces, a second member adjacent said first member having a like plurality of camming surfaces and coupled to said output member for rotation therewith,
   a first clutch pack having a first plurality of first clutch plates splined to said first member and a second plurality of first clutch plates splined to said input member and interleaved with said first plurality of first clutch plates,
   a solenoid coil, an annular plunger at least partially surrounding said solenoid coil and an annular apply plate coupled to said annular plunger and adapted to compress said first clutch pack,
   a second clutch pack having a first plurality of second clutch plates splined to said input member and a second plurality of second clutch plates splined to said output member and interleaved with said first plurality of second clutch plates.

2. The electromagnetic solenoid type clutch assembly of claim 1 wherein said solenoid coil includes a housing and said housing and said annular plunger include complementary, opposed, oblique surfaces.

3. The electromagnetic solenoid type clutch assembly of claim 1 further including an outer housing adapted to receive said input member and an anti-friction bearing for rotatably supporting said input member within said outer housing.

4. The electromagnetic solenoid type clutch assembly of claim 3 wherein said outer housing includes a mounting flange including a plurality of axial openings adapted to receive fasteners.

5. The electromagnetic solenoid type clutch assembly of claim 1 wherein said camming operator further includes a plurality of load transferring members disposed on said camming surfaces.

6. The electromagnetic solenoid type clutch assembly of claim 1 wherein said second member is a pressure plate disposed adjacent said second clutch pack.

7. The electromagnetic solenoid type clutch assembly of claim 1 further including a plurality of seals for sealing an interior region of said clutch assembly containing said first and said second clutch packs and wherein said interior region contains clutch fluid.

8. The electromagnetic solenoid type clutch assembly of claim 1 further including a plurality of studs extending between said annular plunger and said annular apply plate.

9. A torque transfer device having a solenoid operator comprising, in combination,
   a rotatable input member,
   a rotatable output member,
   a cam operator having first and second members defining opposing cam surfaces, said first cam member coupled to said output member for rotation therewith,
   a main clutch having a first plurality of main clutch plates coupled to said input member and a second plurality of main clutch plates interleaved with said first plurality of clutch plates and coupled to said output member,
   a solenoid assembly having an annular coil, an annular plunger radially adjacent said annular coil and an apply plate coupled to said annular plunger, and
   a pilot clutch having a first plurality of pilot clutch plates couple to said input member and a second plurality of pilot clutch plates interleaved with said first plurality of pilot clutch plates, said apply plate disposed adjacent said pilot clutch,
   whereby energization of said annular coil translates said plunger and compresses said pilot clutch.

10. The torque transfer device of claim 9 wherein said annular coil is disposed in a housing and said housing and said annular plunger include complementary, opposed, oblique surfaces.

11. The torque transfer device of claim 9 further including an outer housing assembly adapted to receive said input member and in anti-friction bearing for rotatably supporting said input member in said outer housing.

12. The torque transfer device of claim 9 wherein said output member defines a splined, internal passageway.

13. The torque transfer device of claim 9 further including a plurality of studs extending between said annular plunger and said annular apply plate.

14. The torque transfer device of claim 9 further including a plurality of seals for sealing an interior region of said clutch assembly containing said first and said second clutch packs.

15. A solenoid activated clutch assembly comprising, in combination,
    an input member and a coaxially disposed output member,
    an annular solenoid coil,
    an annular plunger disposed at least partially radially adjacent said solenoid coil,
    a first cam member disposed about said output member, a second cam member splined to said output member for rotation therewith, said cam members including means for axially separating said cam members upon relative rotation,
    a primary friction clutch having a first plurality of primary clutch plates splined to said first cam member and a second, interleaved plurality of primary clutch plates splined to said input member,
    an apply plate coupled to said annular plunger and adapted to compress said primary friction clutch, and
    a secondary friction clutch having a first plurality of secondary clutch plates splined to said input member and a second, interleaved plurality of secondary clutch plates splined to said output member.

16. The solenoid activated clutch assembly of claim 15 further including an outer housing adapted to receive said input member and an anti-friction bearing assembly for rotatably supporting said input member with in said outer housing.

17. The solenoid activated clutch assembly of claim 15 wherein said output member defines a splined bore.

18. The solenoid activated clutch assembly of claim 15 wherein said friction clutches are wet clutches.

19. The solenoid activated clutch assembly of claim 15 further including a plurality of studs extending between said annular plunger and said annular apply plate.

20. The solenoid activated clutch assembly of claim 15 further including a plurality of seals for sealing an interior region of said clutch assembly containing said primary and said secondary friction clutches.

* * * * *